United States Patent [19]

Brusasco

[11] 4,326,748

[45] Apr. 27, 1982

[54] DEVICE FOR ADJUSTING THE RELATIVE ANGULAR POSITION OF TWO ELEMENTS

[76] Inventor: Enzo Brusasco, C.so Re Umberto 64, 10129 Torino, Italy

[21] Appl. No.: 30,173

[22] Filed: Apr. 16, 1979

[30] Foreign Application Priority Data

Apr. 28, 1978 [IT] Italy ............................... 67969 A/78

[51] Int. Cl.³ ............................................. A47C 1/025
[52] U.S. Cl. ...................................... 297/362; 74/800; 16/333; 16/354
[58] Field of Search ............... 297/362, 361, 354, 355; 16/139, 143; 74/800

[56] References Cited

U.S. PATENT DOCUMENTS

| | | | |
|---|---|---|---|
| 2,699,690 | 1/1955 | Kobler | 74/800 |
| 3,640,154 | 2/1972 | Massie | 74/800 |
| 4,054,966 | 10/1977 | Putsch et al. | 297/362 |

FOREIGN PATENT DOCUMENTS

| | | | |
|---|---|---|---|
| 2902813 | 8/1979 | Fed. Rep. of Germany | 74/800 |
| 836362 | 6/1960 | United Kingdom | 74/800 |

Primary Examiner—William E. Lyddane
Attorney, Agent, or Firm—Peterson, Palmatier, Sturm & Sjoquist, Ltd.

[57] ABSTRACT

An adjustment device for adjusting the relative angular position of two elements pivotally connected to one another, in particular two elements connectable one to the cushion and the other to the back of a seat, the device including a case; first and second gears facing each other inside said case and having a different number of teeth; a ball-and-socket joint arranged centrally within said case to support said second gear in an inclined position relative to said first gear and in meshing contact therewith; first and second co-axial shafts pivotally mounted on said case, said first shaft being rigidly connected to said first gear; key means to prevent rotation of said second gear relative to said case; and transmission means arranged between said second gear and said second shaft to transform a rotation of the latter into a precession movement of said second gear about the center of said joint and in meshing contact with said first gear.

14 Claims, 3 Drawing Figures

DEVICE FOR ADJUSTING THE RELATIVE ANGULAR POSITION OF TWO ELEMENTS

This invention relates to a device for adjusting the relative angular position of two elements.

In particular, the invention relates to a device which, thanks to its structural simplicity and its relatively low manufacturing cost, is particularly suitable for being utilized for the adjustment of the relative angular position of two elements formed by two brackets rotatably coupled to one another and rigidly connectable, respectively, the first one to the cushion and the second one to the back of a seat, preferably a motor vehicle seat.

SUMMARY OF THE INVENTION

The invention provides a device of the type specified hereinabove and in which the said second element is angularly coupled to an output shaft of a gearbox rigidly connected to the said first element and comprising an input shaft coaxial to the said output shaft and angularly controllable relative to the said gearbox by means of a control member, and a kinematic chain transmitting the motion between the said input shaft and the said output shaft; wherein the said kinematic chain comprises a first and a second gear facing one another, the said first gear being a face gear and angularly connected to the said output shaft, and the said second gear having a number of teeth different from that of the said first gear and being slanting with respect to the latter so as to engage a section of its periphery; support means for supporting the said second gear in a position of oscillation about a substantially central point of the said gearbox; connection means for angularly connecting the said second gear to the said gearbox; and crank means interposed between the said second gear and the said input shaft to convert an angular movement of the latter into an oscillation of the said second gear about the said central point and in contact with the said first gear.

According to a preferred embodiment of this invention, the adjusting device defined hereinabove comprises releasing means movable from a normal operating position to a position of disengagement to interrupt the transmission of the torque between the said control member and the second element.

BRIEF DESCRIPTION OF THE DRAWINGS

Further features and advantages of the present invention will appear from the following detailed description with reference to the accompanying drawings which show by way of non limiting examples some embodiments of the invention and in which.

DETAILED DESCRIPTION OF THE INVENTION

Figure 1:
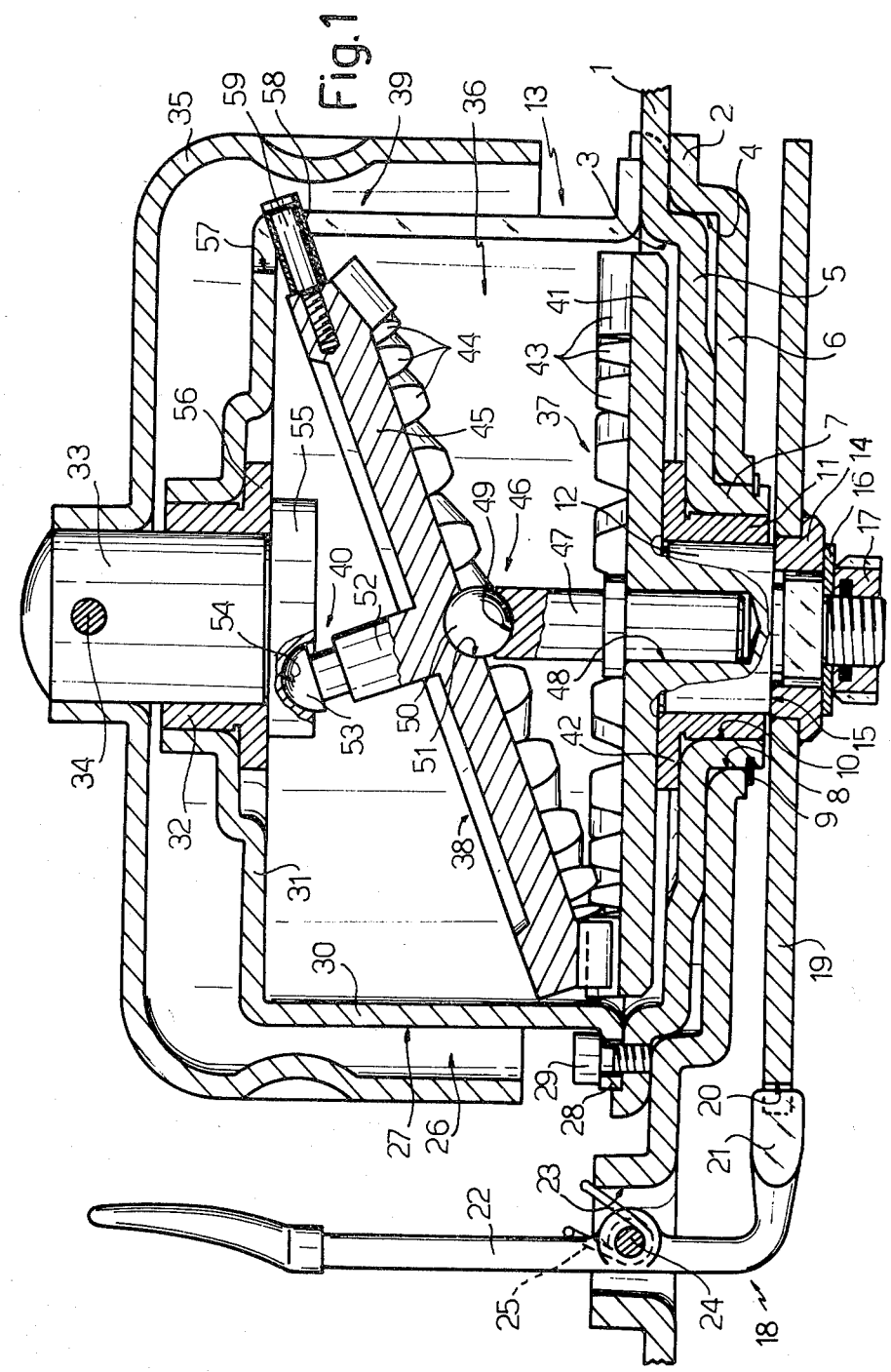
FIG. 1 is an axial sectional view of a first embodiment of the device according to the invention.
Figure 2:
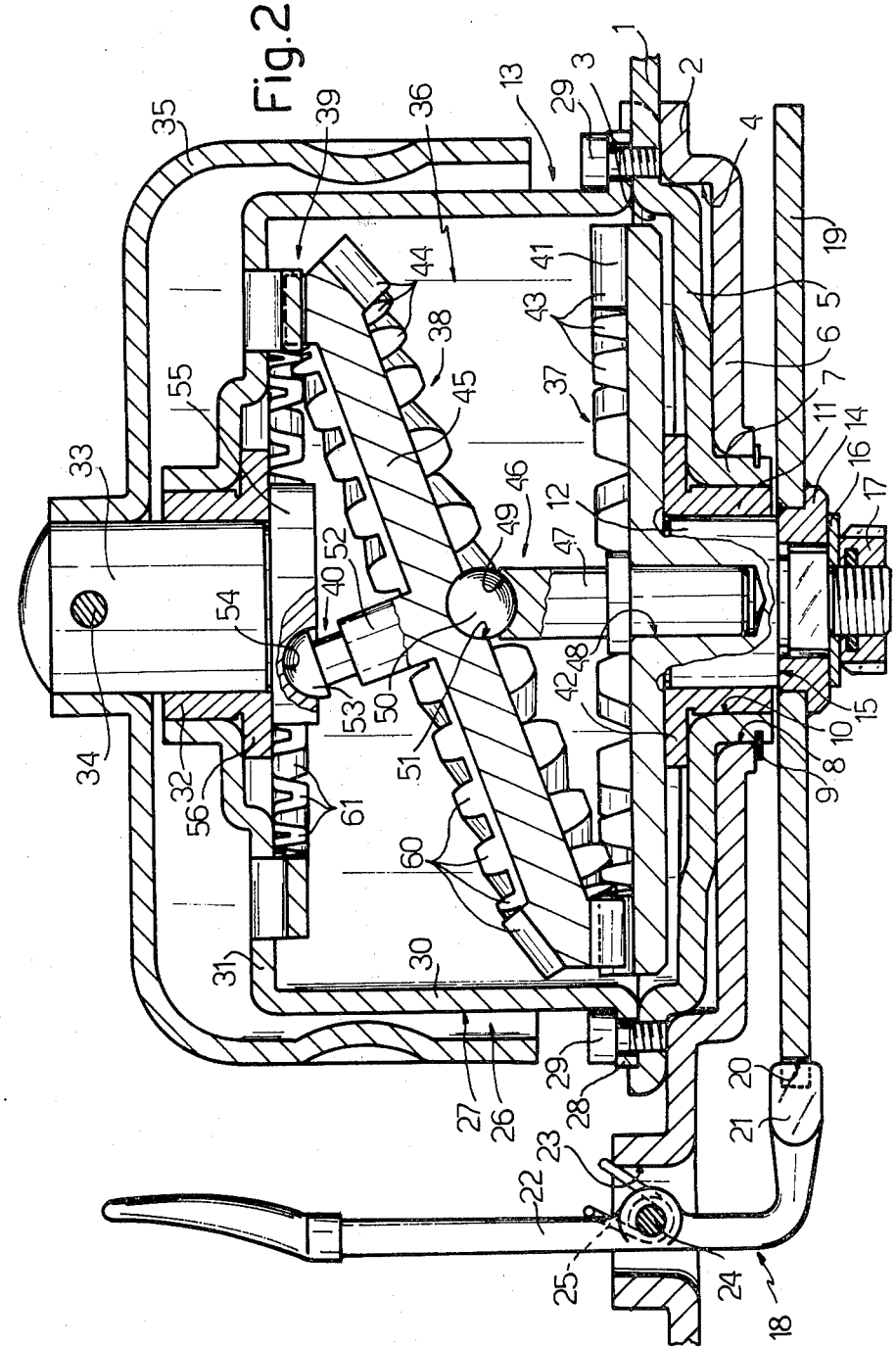
FIGS. 2 and 3 are also axial sectional views showing two modified embodiments of the device shown in FIG. 1.

FIGS. 1 and 2 show two brackets, indicated by reference numerals 1 and 2 respectively, the first of which is angularly connectable to a cushion (not shown) of a seat (not shown) of a motor vehicle (not shown), and the second is rigidly connectable to a back (not shown) of the said seat.

Brackets 1 and 2 are rotatably coupled to one another by means of a cylindrical drawn portion 3 formed on the bracket 1 and extending within a cylindrical drawn portion 4 of the bracket 2 with its own bottom wall 5 substantially in contact with a bottom wall 6 of the drawn portion 4. Wall 5 is formed centrally with a cylindrical protrusion 7 rotatably extending through a central hole 8 of the wall 6, which is axially fixed to the protrusion 7 by means of a resilient ring 9 received within a respective annular cavity formed in the protrusion 7. This latter has a central through hole 10, through which rotatably extends, with the interposition of a housing 11, an output shaft 12 of an adjustment device 13 for the adjustment of the angular position of the bracket 2 with respect to the bracket 1 and, consequently, the slant of the said seat (not shown) relative to the said cushion (not shown).

Of course, the arrangement described hereinabove and comprising the drawn portions 3 and 4, the extension 7, the bushing 11 and the ring 9, may be substituted by any other arrangement apt to ensure both a rotatable coupling of the bracket 2 to the bracket 1 and a rotatable coupling between the said two brackets and the shaft 12.

As shown in FIGS. 1 and 2, the end of the shaft 12 projects from the extension 7 and carries, keyed thereon, a bushing 14 axially fixed against a shoulder 15 of the shaft 12 by means of washer 16 and a selflocking ring nut 17.

Bushing 14 is part of a disengagement device 18 arranged to transmit, normally, the torque between the shaft 12 and the bracket 2. To this end, bushing 14 rigidly supports a disk 19 coaxial to the shaft 12 and whose periphery is provided with a cavity or a radial catch 20 for a pawl 22 forming the end of an L-shaped equalizer which extends through a through hole 23 formed through the bracket 2 and inside which there is mounted a transversal pin 24 forming the fulcrum of the equalizer 22. A spring 25 interposed between the bracket 2 and the equalizer 22 normally maintains this latter with its pawl 21 in engagement with the catch 20 so as to angularly connect the bracket 2 to the disk 19 and, consequently, to the shaft 12.

The adjustment device 13 comprises a substantially cylindrical box 26 which in turn comprises a cup-shaped body 27, preferably made of drawn sheet material, an annular flange 28 of which is connected to the bracket 1 by means of screws 29.

Body 27 comprises a cylindrical sidewall 30 and a bottom wall 31 having an axial tubular extension, through which a shaft 33, coaxial to the shaft 12 and forming the input shaft of the adjustment device 23, is rotatably mounted with the interposition of a bushing 32.

Keyed by means of a transversal pin 34 onto a section of the shaft 33 protruding from the box 26 is a control member formed by a cup-shaped knob 35 which partially covers the box 26.

The shafts 12 and 33 are connected to one another by means of a kinematic chain 36 enclosed within the box 26 and comprising two gears 37 and 38 facing one another and cooperating with one another, which have a different number of teeth.

Preferably, gear 38 has one tooth more or one tooth less than gear 37. This latter is angularly connected to the shaft 12, while gear 38 is angularly fastened to the box 26 by means of a key device 39 and is connected to the shaft 33 through a crank drive 40.

It should be noted that throughout the description and particularly in the claims, the term "gear" is used to indicate a plate having, along its periphery, a plurality of frontal reliefs which generally define a toothing and are apt to engage corresponding reliefs disposed on the plate of the "gear" disposed in front of them.

Referring to FIGS. 1 and 2, gear 37 comprises a circular plate 41 rigidly connected to the shaft 12, which plate is rotatably supported by bracket 1 with the interposition of an annular flange 42 of the bushing 11 and has a plurality of frontal teeth 43, at least two of which engage a tooth of a plurality of conical teeth 44 of the gear 38. This latter comprises a plate 45 which bears along its periphery the teeth 44 and is supported in a slanting position with respect to the plate 41 by means of spherical support 46 so as to rotate about a point situated on the axis of the shafts 12 and 33 and a substantially central position with respect to the box 26.

As shown in FIGS. 1 and 2, the spherical support 46 comprises a pin 47 coaxial to shafts 12 and 33, which pin is received for a first section within a cylindrical cavity 48 formed on the shaft 12 and protrudes with a second section within the box 26. Formed on the free end of the said second section of the pin 47 is a seating 49 in the form of a spherical calotte, inside which there is partially lodged a ball 50 engaged within a substantially hemispherical seating 51 formed centrally on plate 45 and whose center coincides with the center of oscillation of the gear 38.

The crank drive 40, whose function consists not only in imparting an oscillation to the gear 38 about the center of the ball 50 as a result of a rotation of the shaft 33, but also in maintaining the gear 38 in a slanting position and engaged, by at least one of its teeth, with the gear 37, comprises an axial extension 52 extending from plate 45 and terminating with a substantially hemispherical head 53 which engages a substantially hemispherical seating 54 formed in an eccentrical position on the disk 55. The latter is rigidly connected and coaxial to the shaft 33 and is rotatably supported by the bottom wall 30 of body 27 with the interposition of a annular flange 56 of the bushing 32.

In use, since gear 38 is angularly rigidly connected, through the device 39 and the body 27, to the bracket 1 and, consequently, to the cushion (not shown) of the seat (not shown), a 360° rotation of the knob 35 in either direction gives rise to a precession movement of the gear 38 on gear 37 which, when the contact point between gears 37 and 38 has travelled all over the gear 38, results in being shifted with respect to the box 26 by an angle corresponding to a number of teeth of the gear 38 equal to the difference between the number of teeth of the gear 37 and that of the gear 38. This angular movement is transmitted, through the device 18, to the bracket 2 which, moving angularly with respect to the stationary bracket 1, gives rise to a variation of the slant of the back (not shown) of the seat relative to the cushion (not shown) of the seat itself.

In case it is necessary to completely let down the back of the seat backwards into a horizontal position or forwards onto the cushion, the simple actuation of the equalizer 22 against the action of the spring 25 allows to withdraw the pawl 21 from the stop 20, thereby angularly disengaging the bracket 2 from the bracket 1.

As regards the foregoing, it should be pointed out that the presence of the disk 19 renders it possible to move again the back of the seat to its normal position without needing any further fine adjustment operation.

In fact, when the back is moved manually by the action of resilient means (not shown) to its normal position, pawl 21 slides along the periphery of the disk 19 until it meets the stop 20 within which it engages in order to lock the back exactly in the position in which the latter has been set by means of the knob prior to being lowered.

In other words, disk 19 acts as a mechanical memory for the last relative angular position of the brackets 1 and 2 which has been achieved through actuation of the knob 35.

In the embodiment shown in FIG. 1, the key device 39 is realized by means of an axial slot 57 provided in the wall 30 of the body 27 and through which a transversally slidable rotatable radial pin 59 extends which is supported by the plate 45 with the interposition of a bushing 58.

In the embodiment shown in FIG. 2, the key device 39 is realized by means of two toothings having an equal number of teeth and formed the first one by a plurality of conical teeth 60 disposed on the plate 45 at the opposed side to that which supports the teeth 44, and the second one by a plurality of teeth 61 formed preferably by punching and drawing on the wall 31 of the body 27. In the embodiment shown in FIG. 2, since the plate 45 oscillates simultaneously with respect both to the plate 11 and to the wall 31, two precession movements take place during the use of the device.

However, since the number of teeth 60 and that of the teeth 61 are equal, no rotation takes place between the plate 45 and the body 27, so that gear 38 remains angularly locked relative to the box 26.

Figure 3:
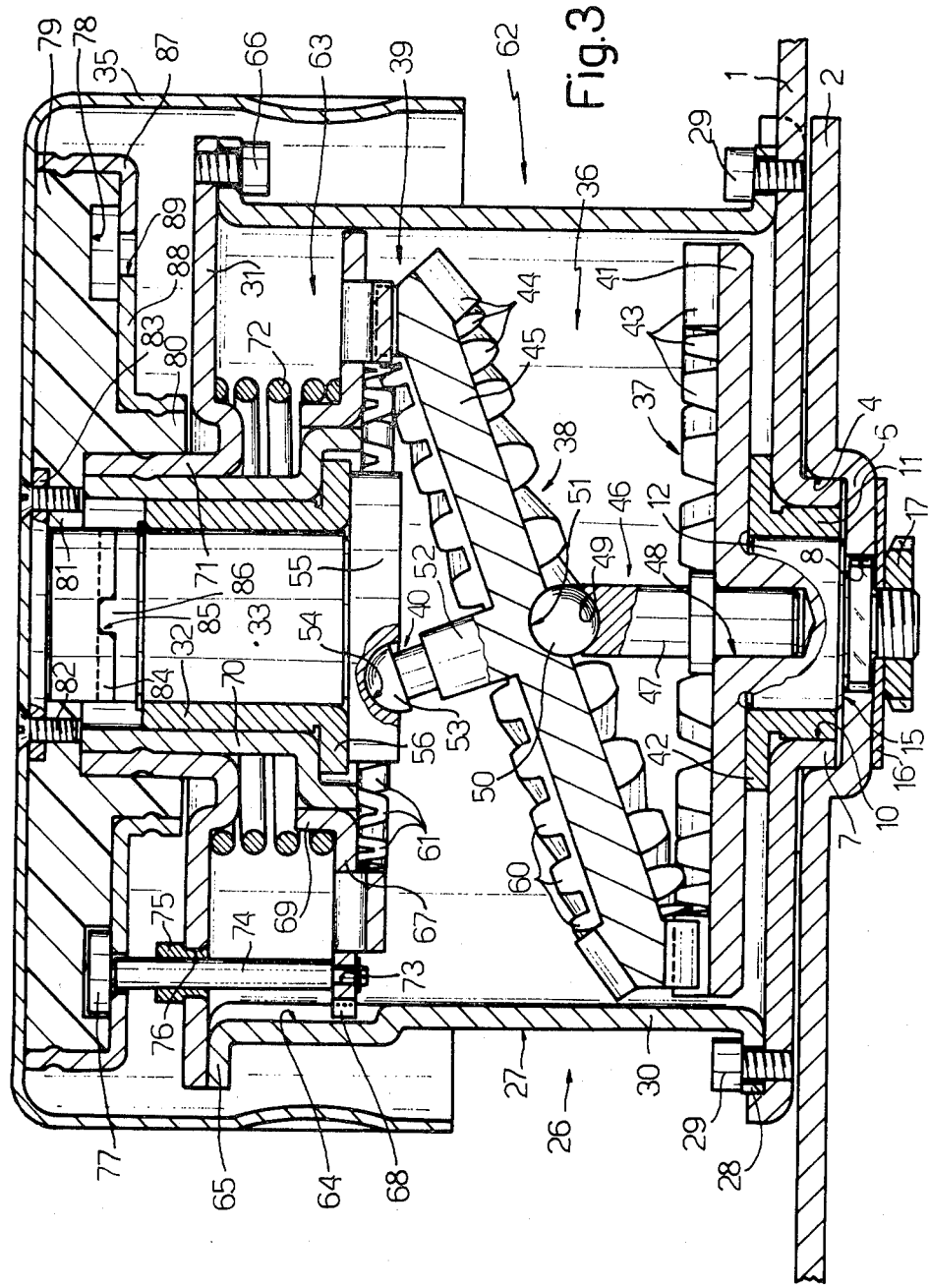

In the embodiment shown in FIG. 3, the relative angular position of the brackets 1 and 2 is adjusted by an adjustment device 62 which is substantially similar to the device 13 shown in FIG. 2, except for some structural details.

First of all, in the device 62 the device 18 is missing and is substituted by a device 63 which will be described later, and bracket 2 is directly keyed on the shaft 12 in correspondence with its hole 8 and is maintained abutting against the shoulder 15 of the shaft 12 by means of the ring nut 17.

Contrarily to the device 18, which acts between the shaft 12 and the bracket 2, device 63 acts so as to allow the angular disengagement of the gear 38 with respect to the box 26. Within the cup-shaped body 27 of the box 26 the sidewall 30 has a plurality of axial grooves 64 (only one of which is shown in the drawing) and an annular flange 65 to which the bottom wall 31 is connected by means of screws 66. By removing these latter it is possible to insert inside the box 26 an annular disk 67 keyed with respect to the box 26 by means of a plurality of radial extensions 68, each of which is slidingly engaged within a respective groove 64.

Disk 67 carries the teeth 61 of the device 39 and is provided with an axial tubular extension 69 through which a guide sleeve 70 slidingly extends, which sleeve 70 is fixed within a tubular extension 71 extending towards the outside from the wall 31 and carries in its interior the bushing 32.

In the device 63, the toothing 61 normally is pushed into engagement with the toothing 60 by a helical spring 72 compressed between the disk 67 and the Wall 31.

In the device 63, the angular disengagement between the gear 38 and the box 26 is obtained by disengaging the toothings 60 and 61 from one another by means of an axial movement of the disk 67 against the action of the spring 72. To this end, disk 67 is provided with a plurality of peripherical holes 73, through each of which the end of a bar 74 is fixed, which bar extends axially outside the box 26 and slidingly engages a respective guide sleeve 75 fixed through a through hole 76 formed in the wall 31.

Each bar 74 terminates, outside the box 26, with a cylindrical head 77 slidingly engaged within an annular groove 78 formed on the front side of an annular body 79 having an axial tubular extension 80 slidingly mounted on the tubular extension 71 of the wall 31.

Inside the extension 80 the body 79 is provided with an annular flange 81, to which the knob 35 is connected by means of screws 82 extending through holes formed through an annular flange of a shaft 84 which is disposed in front of and coaxially to the shaft 33 and is angularly coupled to it by means of a frontal clutch consisting of diametrical groove 85 formed on the shaft 84 and a diametrical clutch dog 86 carried by the shaft 33.

In order to axially fasten the bars 74 to the knob 35 and thus allow the disengagement of the teeth 60 by simply axially moving the knob 35 against the action of the spring 72, the heads 77 are axially fixed within the groove 78 by means of two annular bodies 87 and 88 which are mounted, preferably in a snapping fashion, on the body 79 and define between them an annular slot 89 through which the bars 74 extend slidingly in a transversal direction.

Of course, the principle of the invention remaining unchanged, many variations and modifications can be amplied to the adjustment devices described hereinabove by way of non limiting examples, without departing from the scope of the invention.

What we claim is:

1. An adjustment device for adjusting the relative angular position of first and second elements, particularly first and second brackets articulated to one another by means of a pivot and, the first and second elements being rigidly connectable to the cushion and to the back of a seat, respectively common, preferably a seat of a motor vehicle, the said pivot being angularly coupled to said second element and forming the output shaft of a gearbox rigidly connected to the said first element and comprising an input shaft, coaxial to said output shaft and angularly controllable with respect to the said gearbox by means of a control member, and a kinematic chain transmitting the motion between the said input shaft and said output shaft, wherein said kinematic chain comprises a first and second gear facing one another, the said first gear being a face gear and angularly connected to the said output shaft and the said second gear having a number of teeth different from that of the said first gear and being slanting with respect to said first gear so as to engage a section of its periphery; support means for supporting the said second gear in a position of oscillation about a substantially central point of the said gear box, the said support means comprising a spherical support cooperating with a first hemispherical seating formed centrally on the said second gear, the said spherical support comprising a pin coaxial to the said two shafts and extending from said first gear to the said second gear; connection means for angularly connecting the said second gear to the said gearbox; and crank means interposed between the said second gear and the said input shaft to convert and angular movement of the input shaft into an oscillation of the said second gear about the said central point and in contact with the said first gear.

2. A device as claimed in claim 1, wherein the said crank means comprise a second hemispherical seating formed on the said input shaft in an eccentric position in front of the said second gear, and an extension axially extending from the said second gear and rigidly connected to the latter, the said extension terminating with a spherical head engaged inside the said second spherical seating.

3. A device as claimed in claim 1 or claim 2, wherein the said connection means comprise an axial guide formed along the said gearbox, and a radial extension extending from the said second gear to the said guide in a rotatable and transversely slidable fashion.

4. A device as claimed in claim 1 or claim 3, wherein the said connection means comprise two toothed rings coupled to an facing one another, and of which a first one is angularly rigidly connected to the said gearbox and extends parallel to the said first gear, and the second one is carried by the said second gear.

5. A device as claimed in claim 4, wherein the said two toothed rings have an equal number of teeth.

6. A device according to claim 4 and said pivot being angularly coupled to the second element by catch and pawl means releasably coupled together to prevent relative turning between the pivot and second element, said catch and pawl means allowing when released, relative turning between the pivot and second element.

7. A device as claimed in claim 4, and releasing means interposed between the said second gear and the said gearbox, the releasing means being movable from a normal operative position to a releasing position in order to interrupt the transmission of torque between the control member and the second element.

8. A device as claimed in claim 7, wherein the said releasing means comprise a disk axially slidable relative to the said gearbox against the action of resilient means acting in a direction parallel to the said two shafts; the said disk carrying the said first toothing.

9. A device as claimed in claim 8, wherein the said control member is mounted axially slidable to the said input shaft, connection means being interposed between the said disk and the said control member to axially connect them to one another.

10. A device as claimed in claim 1, wherein the said device includes releasing means movable from a normal operative position to a releasing position in order to interrupt the transmission of the torque between the said control member and the said second element.

11. A device as claimed in claim 10, wherein the said releasing means are interposed between the said output shaft and the said second element.

12. A device as claimed in claim 11, wherein the said releasing means comprise a mechanical memory arranged to store the last relative angular position of the said two elements achieved by actuating the said kinematic chain.

13. Device according to claim 12, wherein the said releasing means comprise a disk keyed on the said output shaft and an angular lever pivoted on the said second element and releasably coupled to a stop formed on the periphery of the said disk.

14. A device according to claim 11, wherein the said releasing means comprise a disk keyed on the said output shaft and an angular lever pivoted on the said second element and releasably coupled to a stop formed on the periphery of the said disk.

* * * * *

UNITED STATES PATENT AND TRADEMARK OFFICE
CERTIFICATE OF CORRECTION

PATENT NO. : 4,326,748
DATED : April 27, 1982
INVENTOR(S) : Enzo Brusasco

It is certified that error appears in the above-identified patent and that said Letters Patent are hereby corrected as shown below:

Column 2, line 11, delete "housing" and substitute --bushing--.

Column 4, line 25, delete "11" and substitute --41--.

Signed and Sealed this

Sixth Day of July 1982

[SEAL]

Attest:

*Attesting Officer*

GERALD J. MOSSINGHOFF

*Commissioner of Patents and Trademarks*